United States Patent
Gaas

(10) Patent No.: US 10,703,290 B2
(45) Date of Patent: Jul. 7, 2020

(54) INTERIOR MODULE FOR A CARGO SPACE OF A VEHICLE, A CARGO SPACE CLADDING AND A MANUFACTURING METHOD FOR MANUFACTURING AN INTERIOR MODULE

(71) Applicant: VOLKSWAGEN AKTIENGESELLSCHAFT, Wolfsburg (DE)

(72) Inventor: Matthias Gaas, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/225,730

(22) Filed: Dec. 19, 2018

(65) Prior Publication Data

US 2019/0184902 A1 Jun. 20, 2019

(30) Foreign Application Priority Data

Dec. 19, 2017 (DE) .................. 10 2017 223 239

(51) Int. Cl.
*B60R 5/04* (2006.01)
*B60R 7/02* (2006.01)
*B60R 11/00* (2006.01)

(52) U.S. Cl.
CPC .............. *B60R 5/044* (2013.01); *B60R 5/047* (2013.01); *B60R 5/048* (2013.01); *B60R 7/02* (2013.01); *B60R 2011/0036* (2013.01); *B60R 2011/0042* (2013.01)

(58) Field of Classification Search
CPC ........ B60R 5/044; B60R 5/045; B60R 5/047; B60R 5/048; B60R 2011/0036; B60R 2011/0042

USPC .................. 296/37.16, 39.1, 1.08
See application file for complete search history.

(56) References Cited

U.S. PATENT DOCUMENTS 5,224,748 A 7/1993 Decker et al.
6,592,165 B2 7/2003 Ament et al.

FOREIGN PATENT DOCUMENTS

| DE | 10038842 A1 | 2/2002 |
|---|---|---|
| DE | 10102627 A1 | 8/2002 |
| DE | 10161647 A1 | 6/2003 |
| DE | 10242339 A1 | 3/2004 |
| DE | 10256348 A1 | 6/2004 |
| DE | 102006008873 A1 | 8/2007 |
| DE | 102006010114 A1 | 8/2007 |
| DE | 602005002429 T2 | 5/2008 |
| DE | 102008061106 A1 | 6/2010 |
| DE | 102014209202 A1 | 11/2015 |
| EP | 0565220 A1 | 10/1993 |
| EP | 1524152 A1 | 4/2005 |
| EP | 1852309 A1 | 11/2007 |
| EP | 2650175 A1 | 10/2013 |
| EP | 299260 A1 | 3/2016 |

(Continued)

*Primary Examiner* — Dennis H Pedder

(74) *Attorney, Agent, or Firm* — Muncy, Geissler, Olds & Lowe, P.C.

(57) ABSTRACT

An interior module for a cargo space of a vehicle having a guide rail in which a guide member of an adjustable cargo space cover can be guided between a first and a second wall, wherein the first wall is formed at least in sections by a section element, and wherein the guide rail has at least a first locking section for locking the guide member in a first locking position. Furthermore, a cargo space cladding for a cargo space of a vehicle and a manufacturing method for manufacturing an interior module is provided.

10 Claims, 4 Drawing Sheets

(56) References Cited

FOREIGN PATENT DOCUMENTS

| | | |
|---|---|---|
| FR | 2962083 A1 | 1/2012 |
| FR | 2999494 A1 | 6/2014 |

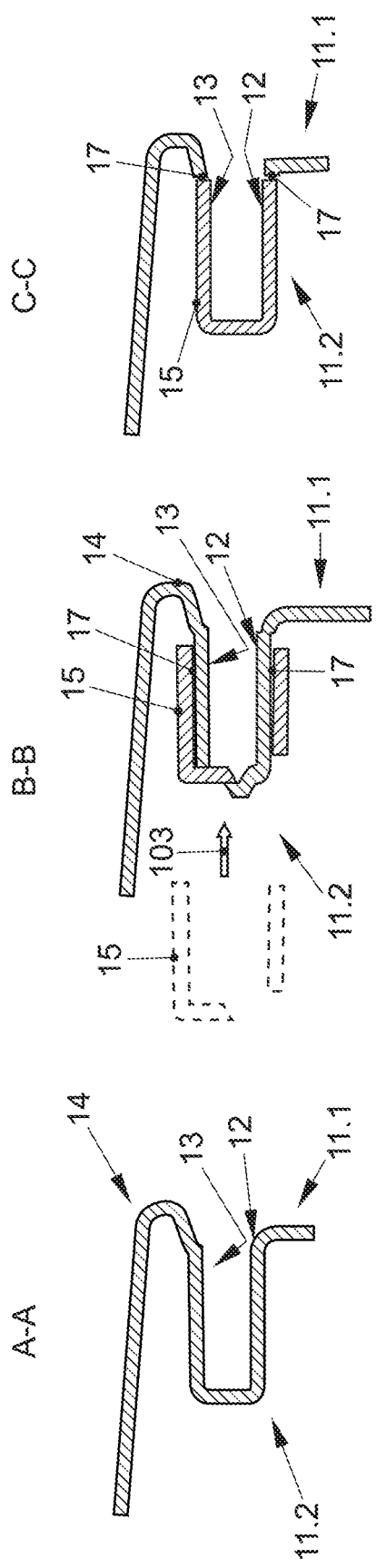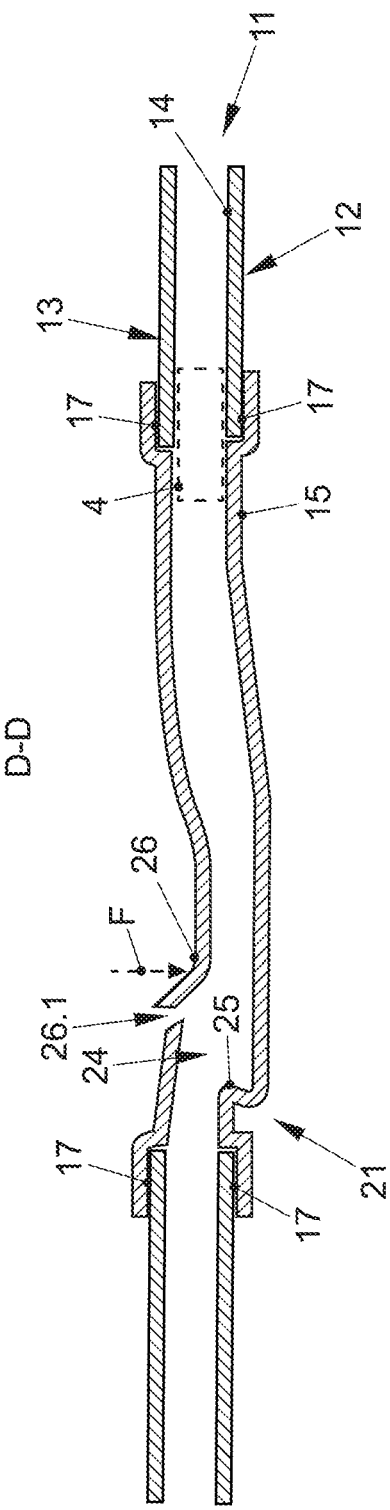

INTERIOR MODULE FOR A CARGO SPACE OF A VEHICLE, A CARGO SPACE CLADDING AND A MANUFACTURING METHOD FOR MANUFACTURING AN INTERIOR MODULE

This nonprovisional application claims priority under 35 U.S.C. § 119(a) to German Patent Application No. 10 2017 223 239.0, which was filed in Germany on Dec. 19, 2017, and which is herein incorporated by reference.

BACKGROUND OF THE INVENTION

Field of the Invention

The present invention relates to an interior module for a cargo space of a vehicle according to the preamble of independent claim 1, a cargo space cladding for a cargo space of a vehicle according to the preamble of independent claim 9, and a manufacturing method for manufacturing an interior module.

Description of the Background Art

From the prior art, it is known to design the cargo space of vehicles, in particular station wagons (so-called estate wagons), in such a way that cargo stowed in the cargo space is at least partially covered. Such a cover has the advantage that on the one hand, the load is secured during travel and on the other hand, the cargo cannot be easily seen from outside the vehicle. However, in order to obtain the greatest possible flexibility, cargo space claddings are often designed to be flexibly adjustable so that a user can also transport larger objects with the vehicle by removing or minimizing the cargo space cladding.

The adjustment of the cargo space cover is frequently guided in the cladding of the cargo space of the vehicle, which includes at least partially of plastic injection molded parts. Thus, it has been known to design the cladding of the cargo space as a plastic injection molded part, and to then mount a guide rail on the injection molded part. In particular for cost reasons it is desirable, however, to produce the largest possible portion of the cladding and the guide mechanism in one piece in the same injection molding tool. The problem with this is that if the guide rail and the interior cladding are designed completely in one piece, having several locking points within the guide rail can make it impossible to demold the component in certain designs.

From the prior art, for example, a cargo space cover is known from EP 1 524 152 A1, in which a lock is mounted below the guide rail in order to set breakpoints for the cargo space cover. However, this requires breaking through part of the rail resulting in further mechanical processes being necessary when the rail is removed from the injection mold.

SUMMARY OF THE INVENTION

It is therefore an object of the present invention to at least partially resolve the above-mentioned disadvantages known from the prior art. In particular, it is an object of the present invention to improve the manufacturing of a cargo space cladding for a cargo space of a vehicle, in particular so that design flexibility of the cargo space cladding is increased and/or the manufacturing costs of the cargo space cladding are reduced.

According to an exemplary embodiment of the invention, an interior module for a cargo space of a vehicle has a guide rail in which a guide member of an adjustable cargo space cover can be guided between a first and a second wall. In this case, the first wall can be at least partially formed by a section element. Further, the guide rail can have at least a first locking section for locking the guide member in a first locking position. Here, the second wall section is at least partially formed by an insert element, which is separate from the section element, at least in the first locking section.

The second wall may be formed completely by the insert element at least in the first locking section. The adjustable cargo space cover can preferably be an automatically adjustable cargo space cover. In this case, the cargo space cover preferably comprises a shutter element, which is connected to the guide member. In particular, two guide members may be provided, wherein in each case a guide member is guided on one side of the cargo space.

In particular, the interior module can thus preferably be provided for unilateral mounting in the cargo space, wherein an accordingly mirrored interior module preferably may be provided on the other side of the cargo space. A guide member may preferably be understood to be a roller or a sliding block, which or which may have a movement direction predetermined by the guide rail. Preferably, the guide rail is suitable for the positive guidance of the guide member, in particular wherein said first and second wall define boundaries for the guide rail. In particular, the first and second walls may also be referred to as the first and second track elements. The first wall is formed at least in sections by section elements. A section element can be understood to be a guide which specifies at least part of the guide section of the guide member. In particular, the guide rail can be designed for horizontal or substantially horizontal guidance of the guide member in the vehicle. Preferably, the section element can be integrally formed over a certain section or over the entire guide rail. In particular, a first locking section is also provided in order to lock the cargo space cover or the guide member in a first locking position. Thus, the first locking position can be provided, wherein for example an end position or an intermediate position of the guide member of the cargo space cover may be predetermined by the first locking position. Furthermore, an insert element is provided which is formed separately from the section element. The fact that the insert element is formed separately from the section element can be understood such in the context of the invention that the insert element is at least manufactured separately from the section element. Thus, it can be provided that the section element is produced as a single component and the insert element as a further component, in particular in another tool, so that the section element and the insert element are combined to form an assembly only during assembly of the interior module. In particular, the insert element may further be a preassembled unit which is mounted on the section element during assembly of the interior module. The adjustable cargo space cover may be an automatically or semi-automatically adjustable cargo space cover. In such cargo space covers, the inventive design of the interior module may be particularly advantageous if, for example, special demands are placed on the first locking section as a result of the drive of the cargo space cover.

This results in a high degree of design freedom for the guide rail. Thus, it is not necessary, for example, that a portion of the locking section is taken into account during demolding of the section element, which results in greater freedom of design and/or better demoldability during manufacturing, in particular with respect to the surrounding surfaces. Thus, at the same time the production of the guide rail and therefore of the interior module can be simplified, thereby saving further costs. Furthermore, the function of the guide rail can be improved, since by means of the separate production of the insert element, for example, more complex geometries, in particular of the locking section, can be produced economically. For example, said element may have a different direction of demolding than the section element and/or be post-processed separately.

The insert element can be fixed positively, cohesively and/or non-positively to the section element. Thus, a connection area may be provided on which the insert element is fixed directly to the section element. The insert element, for example, may be engaged with the section element. This provides a simple way to ensure a positive and/or non-positive connection between the insert element and the section element that can be quickly and easily executed also when mounting the insert element on the section element. Further, it is conceivable that the insert element is welded to the section element, in particular plastic-welded, so that a cohesive connection is formed. Welding ensures a particularly safe connection of the insert element with the section element, wherein at the same time the transition from insert element to section element within the guide rail can be continuous. In particular, the insert element can be flush with the section element. As a result, the running characteristics of the guide member can be improved in the guide rail. By welding, the section element and the insert element can thus be combined into a part that can be worked as a single component or as a single unit, which, however, has in particular a connection area in which, for example, a welded seam is provided.

The first locking section can have a locking projection, which can be negotiated by the guide member, wherein the insert element has a hold down device by means of which the guide member can be fixed on the locking projection in the first locking position. Thus, in particular the locking function can be provided by the insert element. Preferably, the negotiation of the locking projection in the sense of the present invention can be understood to mean that the guide member can generally, i.e., in particular under certain conditions, move past the locking projection. This may for example be the case when the guide member assumes a certain tilting position or a force is applied to the hold down device. Integrating the hold down device in the insert element may also have advantages in respect of the assembly if the insert element can be processed prior to the assembly situation. The locking projection can also be integrated in the insert element. Due to the locking function by means of the hold down device and the locking projection, the locking function can also be realized in a simple manner. This way, the locking projection and the hold down device can be integrated directly in the guide rail, thus ensuring reliable locking action.

Furthermore, it may be provided that in the inventive interior module, the hold down device can be designed as an elastically deformable part of the second wall, so that the hold down device applies a force to the guide member in the first locking position. This is a particularly simple manner in which the hold down device can be configured. Advantageously, the second wall may have a gap through which a part of the second wall may be movable in particular by bending. In particular, the elastically deformable portion of the second wall may be formed tongue-like. Preferably, the insert element comprises a plastic, more preferably a polypropylene (PP). Thereby, the resilient function can be realized reliably, with a long service life of the elastic deformation, and at the same time the manufacturing costs can be kept low. In particular, it can thus be provided that the guide member is designed as a sliding block and is capable of passing over the locking projection of the first locking section, wherein the guide member can be oriented accordingly in the guide rail. By means of the hold down device, however, the guide member may preferably be pressed against the first wall and held against the locking projection in the first locking position without opposing force. When applying a counter force, the hold down device can be elastically deformed and the guide element can accordingly negotiate the locking projection.

The section element can be designed in one piece, with a cladding element for the cargo space. Thus, the section element and a part of the cladding of the cargo space of the vehicle can be manufactured, for example, as a plastic injection molded part. Particularly, in the sense of the present invention, an integral construction can be understood to be, in particular, plastic molding in the same mold, wherein the section element and the cladding element can preferably be manufactured at the same time or in the same tool. As a result, the manufacturing of the interior module can be simplified as a whole. In particular, storage and logistics costs are also saved when the section element and the cladding element are in one piece. Furthermore, by using the insert element, the greatest possible freedom of design can be maintained, in particular since the critical point for demolding a molded part falls on a separate component, i.e., the insert element. Furthermore, the fastening of the insert element on the section element can be designed simpler than a fastening of the section element on the cladding element.

The guide rail can have a second and a third locking section, wherein the first locking section is arranged between the second and the third locking sections. In particular, the first locking section is the middle locking section of the guide rail. The second and third locking sections may be at least partially integrally formed with the section element or have further insert elements. In particular, the second and third locking sections can also represent end positions of the cargo space cover. In this case, the end positions can be formed simpler than, for example, the first locking section, since these can ensure the locking and moving of the guide member in only one direction, while in each case the other direction may be blocked by a boundary of the guide rail.

The guide rail may further comprise a cargo space side, which can be oriented towards the cargo space of the vehicle, and a body side, which can be oriented towards the body of the vehicle, wherein the insert element is mounted from the body side. Thus, the section element and the insert element can overlap such in the connection area, for example, that the insert element protrudes towards the body side instead of towards the section element. This will ensure in a particularly simple manner that at least in the region of the guide of the guide member, the insert element is flush with the section element so that the guide member will run reliably in the guide rail. In addition, the connection area can thus be concealed to the user or be substantially invisible behind the front of the cladding element and/or the section element so that the aesthetic impression of the interior module is not clouded from the outside. When installed, the body side may be completely hidden from the user behind the cargo space side.

The second wall between the second and third locking sections can be formed by the insert element, and/or that the insert element in the first locking section forms at least a part of the first and the second walls. Thus, it can be provided that the second wall is completely or substantially completely formed by the insert element. Specifically, a complete upper area of the guide rail can thus be formed by the insert element and be placed on the first wall or the section element. Alternatively, it is conceivable that the insert element forms only a part of the guide rail and is provided only in the area of the first locking section. This allows for the insert to be made small and easy to handle.

A cargo space cladding for a cargo space of a vehicle is also provided. The cargo space cladding can have an adjustable cargo space cover and at least one interior module according to the invention having a guide rail, in which a guide member of the cargo space cover is guided between a first and a second wall. In this case, the first wall is formed at least in sections by a section element, wherein the guide rail has at least one first locking section to lock the guide member in a first locking position. At least in the first locking section, the second wall is at least partially formed by an insert element that is separate from the section element. The adjustable cargo space cover may preferably be independently or automatically adjustable. For this purpose, the cargo space cladding in particular may have a drive element, wherein the drive element may preferably be an electric motor or a spring. In particular, the cargo space cover can be guided horizontally or substantially horizontally in the vehicle. Thus, in the installed state, the guide rail can preferably extend horizontally or substantially horizontally in the vehicle.

Thus, a cargo space cladding according to the invention provides the same advantages as have already been described in detail with respect to an inventive interior module. In particular, it is conceivable that the cargo space cladding has a second interior module, which is formed in mirror image to the first interior module so that the cargo space cover can be guided on two sides.

According to a further aspect of the invention, a manufacturing method is provided for producing an interior module. Preferably, the interior module may be an interior module according to the invention. The manufacturing method includes the following steps: molding, in particular plastic injection molding, of a section element of a first wall of a guide rail, in which a guide member can be guided between the first wall and a second wall; manufacturing of an insert element by means of which the second wall at least in a first locking section can be at least partially formed for locking the guide member in a first locking position of the guide rail; and/or mounting of the insert element with the section element.

The mounting of the insert element with the section element may, for example, comprise fastening the insert element to the section element. In particular, the insert element can be engaged with or welded to the section element, in particular plastic welded. However, other types of attachment, such as screwing or the like, are also possible. The molding of the section element is preferably done by plastic injection molding. In particular, the molding of a cladding element for the cargo space of the vehicle is simultaneously carried out, wherein the section element and the cladding element can be cast in particular in one piece. The manufacturing of the insert element can preferably also be carried out by a plastic injection molding and/or mechanical processing. For example, the insert element may be a milled part. Preferably, the insert element is first injection-molded and then finished mechanically. In this case, a hold down device may also be mounted on the second wall.

In particular, costs can be saved by means of an inventive manufacturing method, and at the same time, a high degree of design freedom of the individual components and component surfaces can be retained. By manufacturing the insert element separately from the molding of the section element, it may not be necessary, for example, to consider the insert element during demolding of the section element. Thus, the inventive manufacturing method provides the same advantages, as they have already been described in detail with respect to the inventive cargo space cladding and/or the inventive interior module. In particular, the manufactured interior module may be suitable for use in a cargo space cladding according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 2a to 2d are schematic views of sectional representations of a guide rail of the interior module.

DETAILED DESCRIPTION

Figure 1:
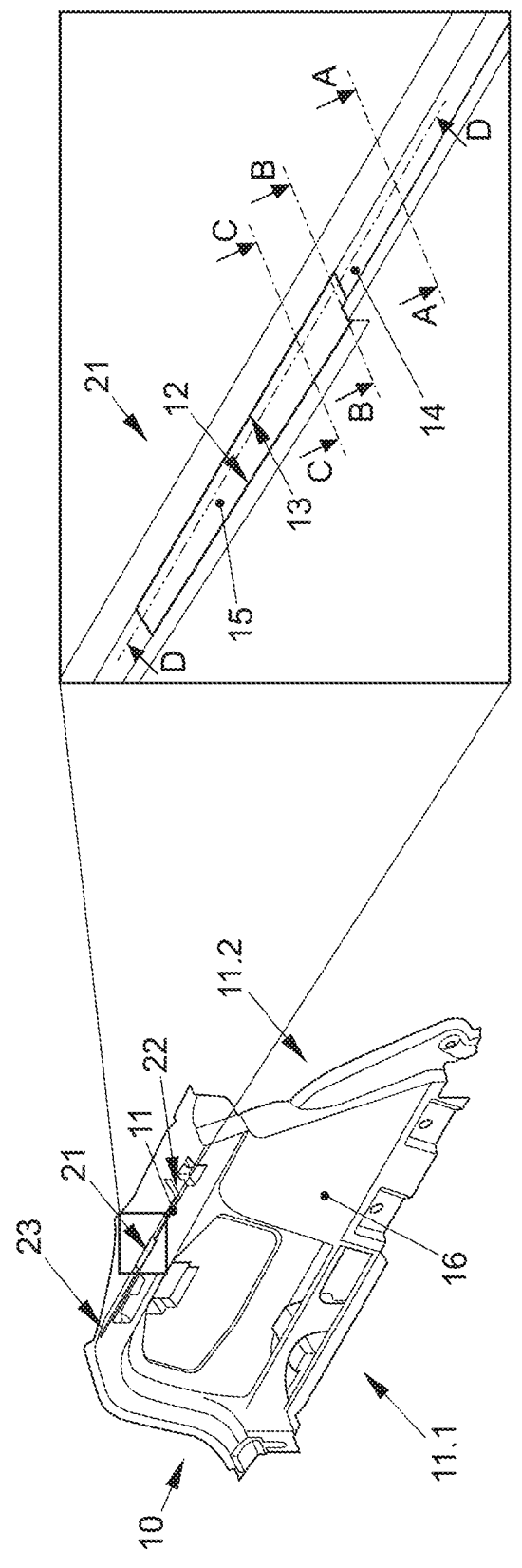
FIG. 1 is a schematic perspective view of an inventive interior module.

FIG. 1 shows an inventive interior module 10 in a first embodiment in a detailed, schematic perspective view. The interior module 10 is suitable for use in a cargo space 2 of a vehicle 1 and comprises a guide rail 11, in which a guide member 4 of an adjustable cargo space cover 3 can be guided. The guide rail 11 is designed in one piece with a cladding element 16 of a cargo space cladding 6. In the perspective view shown in FIG. 1, the interior module 10 is further shown from a cargo space side 11.1, which can be aligned with the cargo space 2 of the vehicle 1. The guide rail 11 has three locking sections 21, 22, 23, wherein a first locking section 21 is arranged between a second locking section 22 and a third locking section 23. The second and third locking sections 22, 23 each form end positions for the cargo space cover 3 or the guide member 4 of the adjustable cargo space cover 3. The first locking section 21 is further suitable for locking the guide member 4 in a first locking position 24, wherein the first locking position 24 may also be referred to as the middle locking position with respect to the cargo space cover 3. According to the detailed view of the first locking section 21, it is provided that the guide rail 11 has a first wall 12 and a second wall 13, between which the guide member 4 is guided. The first wall 12 is at least partly formed by a section element 14 and the second wall 13, at least in the first locking section 21, is formed by an insert element 15 that is separate from the section element 14. To provide the locking function in the first locking section 21 of the guide rail 11, the insert element 15 is at least partially decoupled from the section element 14 during manufacturing so that in designing the demolding or demolding surfaces, the first locking section 21 does not have to be considered or only partially considered.

FIGS. 2a to 2d further show schematic, sectional views, wherein the sections each refer to the detailed illustration in FIG. 1. Thus, FIG. 2a shows a section A-A according to the embodiment of FIG. 1, wherein in this portion of the guide rail 11, the first wall 12 and the second wall 13 are designed integrally and thus together form the section element 14 in this section. FIG. 2b further shows another sectional view according to section B-B of FIG. 1, wherein in this section, the section element 14 still forms the first and second walls 12, 13, in particular wherein the walls 12, 13 have a connection area 17 with the insert element 15. Furthermore, a possible assembly 103 of the insert element 15 is shown in dashed lines from a body side 11.2 of the interior module 10. FIG. 2c further shows a section C-C of FIG. 1, wherein the first and second walls 12, 13 in this section are formed completely by the insert element 15. FIG. 2d further shows a section D-D of FIG. 1 in a schematic representation, wherein it is clear that in the first locking section 21, the first and second walls 12, 13 are formed by the insert element 15, whereas in the further course of the guide rail 11, the first and second walls 12, 13 are formed by the section element 14. The first locking section 21 further includes a first locking position 24 in which the guide member 4 of the cargo space cover 3 can be locked. For this purpose, the insert element 15 has a locking projection 25, which can generally be negotiated by the guide member 4 when the guide member 4 moves in the guide rail 11. To lock the guide member 4 in the first locking position 24, the insert element 15 further includes a hold down device 26 by means of which a force F can be applied to the guide member 4 so that the guide member 4 is locked on the locking projection 25. To release the guide member 4 from the first locking position 24, thus, a counter force against force F may be required. In particular, the hold down device 26 is designed as an elastic portion of the second wall 13, wherein a recess 26.1 causes the at least partial mobility of the hold down device 26. For this purpose, the insert element 15 may preferably be made of an elastic material, preferably of a plastic, particularly preferably of a polypropylene (PP).

Figure 3:
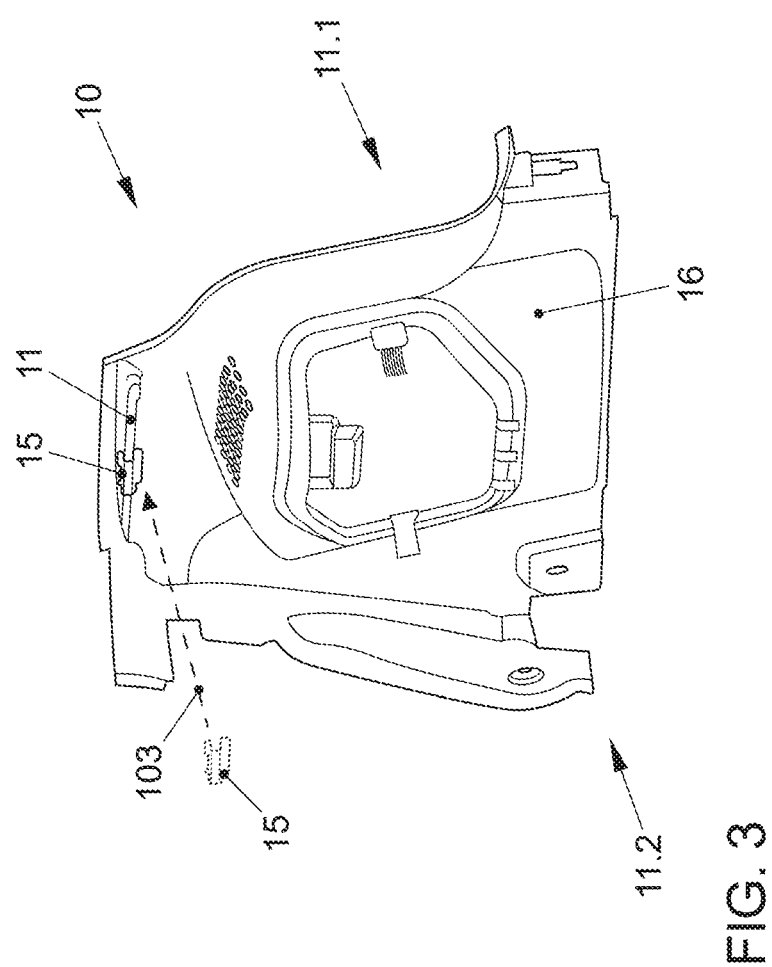
FIG. 3 is a rear, schematic perspective view of the interior module.

FIG. 3 further shows a view of the interior module 10 from a body side 11.2 which is alignable with the body 5 of the vehicle 1. Here, the mounting 103 of the insert element 15 is shown, which forms a part of the guide rail 11 in the assembled state. Furthermore, it is clear that in order to provide many different functions and design aspects, the cladding element 16 requires a high degree of structural freedom, which is heightened by decoupling the insert element 15 during manufacturing.

Figure 4:
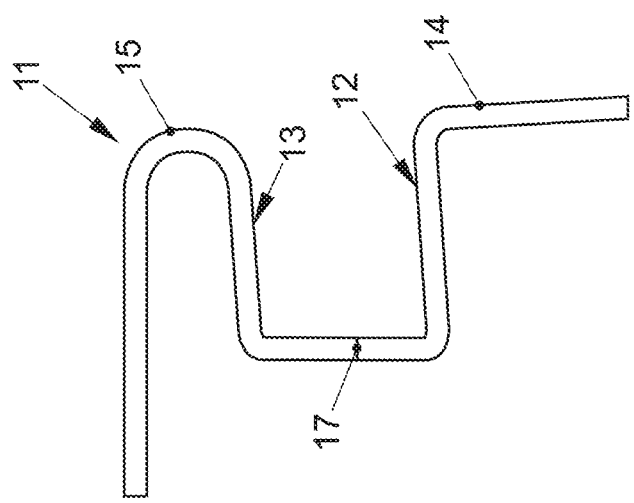
FIG. 4 is a schematic, sectional view of a guide rail of an interior module.

FIG. 4 shows a guide rail 11 of the inventive interior module 10 in a schematic sectional view in a further embodiment. In this case, the guide rail 11 has a first wall 12 and a second wall 13, wherein a connection area 17 is provided between the first and second walls 12, 13, by means of which a section element 14, which forms the first wall 12 of the guide rail 11, and an insert element 15, which forms the second wall 13 of the guide rail 11, are connected. Thus, for example, the second wall 13 may be completely or substantially fully formed by the insert element 15. With such an embodiment, the section element 14 and the insert element 15 can also be decoupled during manufacturing, and in designing the section element 14, the design of the demolding direction can thus be simplified if said section element is for example designed as a molded part. In particular, the second wall 13 may have a hold down device 26 by means of which a first locking position 24 of a first locking section 21 of the guide rail 11 is definable.

Figure 5:
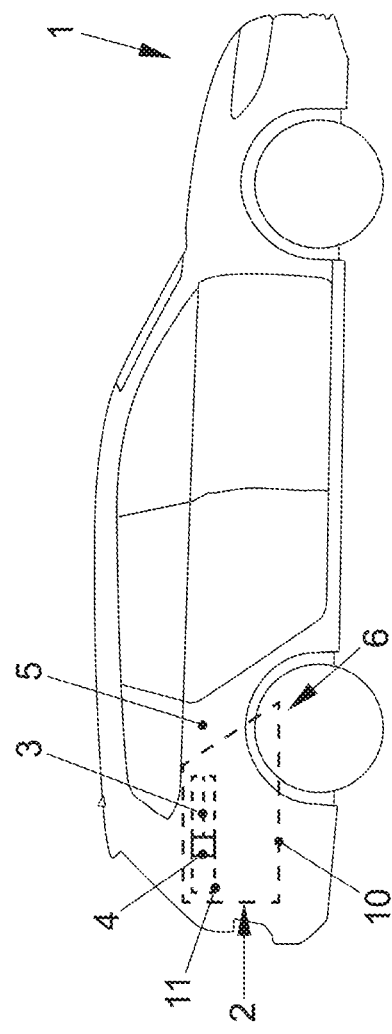
FIG. 5 illustrates a vehicle with a cargo space cladding according to the invention.

FIG. 5 further displays a vehicle 1 with a cargo space 2, wherein the cargo space 2 of the vehicle 1 has a cargo space cladding 6. The cargo space cladding 6 is fastened in the cargo space 2 to the body 5 of the vehicle 1 and has an adjustable cargo space cover 3 by means of which the cargo space 2 can at least partially be closed. Thus, items stored in the cargo space 2 will not be visible to the outside and/or will be secured when driving the vehicle 1. For supporting the cargo space cover 3, the cargo space cover 3 further comprises a guide member 4 which is mounted in a guide rail 11 of an interior module 10 according to the invention. Preferably, the cargo space cover 3 has two guide members 4, which are in particular mounted symmetrically on the sides of the cargo space 2. For this purpose, two interior modules 10 according to the invention may be provided in a mirror-inverted version for the sides of the cargo space cladding 6. In particular, the interior module 10 or interior modules 10 may be formed according to one of the preceding embodiments.

Figure 6:
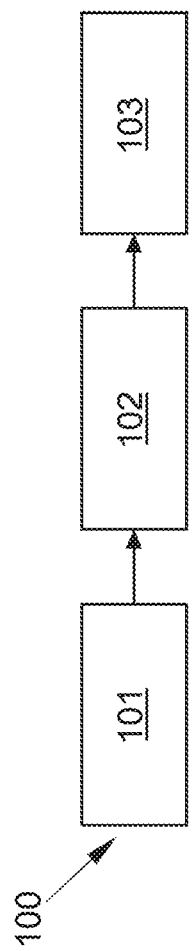
FIG. 6 illustrates an inventive manufacturing method for manufacturing an interior module.

FIG. 6 further shows a manufacturing method 100 for manufacturing an interior module 10, in particular an interior module according to one of the preceding embodiments. Here, it is provided that a section element 14 of a first wall 12 of a guide rail 11 is molded 101, wherein the guide rail 11 is provided to guide a guide member 4 between the first wall 12 and a second wall 13. The molding 101 may preferably be carried out as plastic injection molding, and at the same time or in the same tool with the molding of a cladding element 16 of a cargo space cladding 6. Furthermore, the manufacturing 102 of an insert element 15 is provided, which at least in a first locking section 21 can form the second wall 13 for locking the guide member 4 in a first locking position 24 of the guide rail 11. The manufacturing 102 may in this case involve plastic injection molding and/or mechanical processing. After molding 101 and manufacturing 102, the insert element 15 is mounted 103 with the section element 14. In this case, the mounting 103 may include a fastening of the insert element 15 on the section element 14, wherein the fastening can preferably be made cohesively, non-positively and/or positively. This way, an interior module can be produced in a simple manner, which allows for a high degree of design freedom, in particular for a molded cladding element 16 for a cargo space 2 of a vehicle 1.

The foregoing explanation of the embodiments describes the present invention only in the context of examples. Of course, individual features of the embodiments can, if technically feasible, be combined freely with one another without departing from the scope of the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An interior module for a cargo space of a vehicle, the interior module comprising:

a guide rail having a first wall and a second wall, wherein a guide member of an adjustable cargo space cover is adapted to be guided between the first wall and the second wall, wherein the first wall is formed, at least in sections, by a section element, wherein the guide rail has at least one first locking section for locking the guide member in a first locking position, wherein, at least in the first locking section, the second wall is at least partially formed by an insert element that is separate from the section element, wherein the guide rail has a cargo space side that is aliened with the cargo space of the vehicle, and has a body side that is aligned with a body of the vehicle, and wherein the insert element is mounted from the body side.

2. The interior module according to claim 1, wherein the insert element is fastened on the section element.

3. The interior module according to claim 1, wherein the first locking section has a locking projection, which is negotiated by the guide member, wherein the insert element has a hold down device via which the guide member is locked on the locking projection in the first locking position.

4. An interior module for a cargo space of a vehicle, the interior module comprising:

a guide rail having a first wall and a second wall, wherein a guide member of an adjustable cargo space cover is adapted to be guided between the first wall and the second wall, wherein the first wall is formed, at least in sections, by a section element, wherein the guide rail has at least one first locking section for locking the guide member in a first locking position, wherein, at least in the first locking section, the second wall is at least partially formed by an insert element that is separate from the section element, wherein the first locking section has a locking projection, which is negotiated by the guide member, wherein the insert element has a hold down device via which the guide member is locked on the locking projection in the first locking position, and wherein the hold down device is an elastically deformable part of the second wall so that a force is applied to the guide member in the first locking position by the hold down device.

5. The interior module according to claim 1, wherein the section element is formed integrally with a cladding element for the cargo space.

6. The interior module according to claim 1, wherein the guide rail has a second and a third locking section, and wherein the first locking section is arranged between the second and the third locking sections.

7. The interior module according to claim 1, wherein the insert element additionally forms at least a portion of the first wall in the first locking section.

8. A cargo space cladding for a cargo space of a vehicle, the cargo space cladding comprising:

an adjustable cargo space cover; and at least one interior module that includes a guide rail having a first wall and a second wall, wherein a guide member of the cargo space cover is guided between the first wall and the second wall, wherein the first wall is formed at least in sections by a section element, wherein the guide rail has at least one first locking section for locking the guide member in a first locking position, wherein, at least in the first locking section, the second wall is formed at least partially by an insert element that is separate from the section element, wherein the guide rail has a cargo space side that is aligned with the cargo space of the vehicle, and has a body side that is aligned with a body of the vehicle, and wherein the insert element is mounted from the body side.

9. A manufacturing method for manufacturing an interior module for a cargo space of a vehicle, the method comprising:

molding a section element of a first wall of a guide rail in which a guide member is adapted to be guided between the first wall and a second wall;

providing an insert element, via which the second wall is at least partially formed, in a first locking section of the guide rail for locking the guide member in a first locking position;

mounting the insert element with the section element, wherein the guide rail has a cargo space side that is to be aligned with the cargo space of the vehicle, and has a body side that is to be aligned with a body of the vehicle, and wherein the insert element is mounted from the body side.

10. The interior module according to claim 6, wherein the second wall between the second locking section and the third locking section is formed by the insert element.

* * * * *